(12) United States Patent
Kim

(10) Patent No.: US 7,707,447 B2
(45) Date of Patent: *Apr. 27, 2010

(54) APPARATUS AND METHOD FOR MANAGING POWER IN COMPUTER SYSTEM

(75) Inventor: Seo Kwang Kim, Incheon-si (KR)

(73) Assignee: LG Electronics Inc., Seoul (KR)

( * ) Notice: Subject to any disclaimer, the term of this patent is extended or adjusted under 35 U.S.C. 154(b) by 222 days.

This patent is subject to a terminal disclaimer.

(21) Appl. No.: 11/848,622

(22) Filed: Aug. 31, 2007

(65) Prior Publication Data

US 2007/0294554 A1   Dec. 20, 2007

Related U.S. Application Data

(63) Continuation of application No. 10/630,771, filed on Jul. 31, 2003, now Pat. No. 7,376,851.

(30) Foreign Application Priority Data

Oct. 31, 2002   (KR) ................ 2002/66828

(51) Int. Cl.
    *G06F 1/32*   (2006.01)
(52) U.S. Cl. .................... 713/324; 713/323; 710/18
(58) Field of Classification Search ................ 713/323, 713/324; 710/18
    See application file for complete search history.

(56) References Cited

U.S. PATENT DOCUMENTS 5,361,364 A    11/1994   Nagashige
5,655,126 A *   8/1997   Glenning ................ 713/324
5,784,628 A     7/1998   Reneris
6,065,125 A     5/2000   Shiell et al.

(Continued)

FOREIGN PATENT DOCUMENTS

WO    WO 99 17187    4/1999

OTHER PUBLICATIONS

Lu, et al., "Software Controlled Power Management," 7th International Workshop on Hardware/Software Codesign, Rome, Italy, (May 3-5, 1999), New York, NY: ACM, US, May 3, 1999, 157-161.

(Continued)

*Primary Examiner*—Thuan N Du
(74) *Attorney, Agent, or Firm*—Ked & Associates LLP

(57) ABSTRACT

The present invention relates to an apparatus and a method for managing power in a computer system. A filter driver can be equipped with a packet monitoring function or the like detects whether devices mounted in the computer system are in the idle state. If a device is in the idle state, the power mode of the corresponding device is varied to the power down mode, independent of the system power mode state that has been set up by the operation system in the computer system. In this manner, power supplied to devices in the idle state is reduced, and it becomes possible to have a more efficient control over the load of the computer system. Overall, preferred embodiments according to the present invention can be very advantageously used for developing and expanding the computer system more simply by adding the filter driver into the system, without changing a device driver in the computer system.

14 Claims, 9 Drawing Sheets

U.S. PATENT DOCUMENTS

| | | | |
|---|---|---|---|
| 6,067,627 | A | 5/2000 | Reents |
| 6,092,209 | A | 7/2000 | Holzhammer |
| 6,128,745 | A * | 10/2000 | Anderson et al. ........... 713/323 |
| 6,314,523 | B1 | 11/2001 | Voltz |
| 6,523,123 | B1 | 2/2003 | Barbee |
| 7,103,788 | B1 | 9/2006 | Souza et al. |
| 2002/0016904 | A1 | 2/2002 | Chrysanthakopoulos |
| 2003/0051179 | A1 | 3/2003 | Tsirkel et al. |

OTHER PUBLICATIONS

Lu, et al., "Comparing System-Level Power Management Policies," IEEE Design & Test Computers, IEEE Service Center, (Mar. 1, 2001), New York, NY, US, 18:2:10-19.

European Search Report dated Mar. 5, 2009.

* cited by examiner

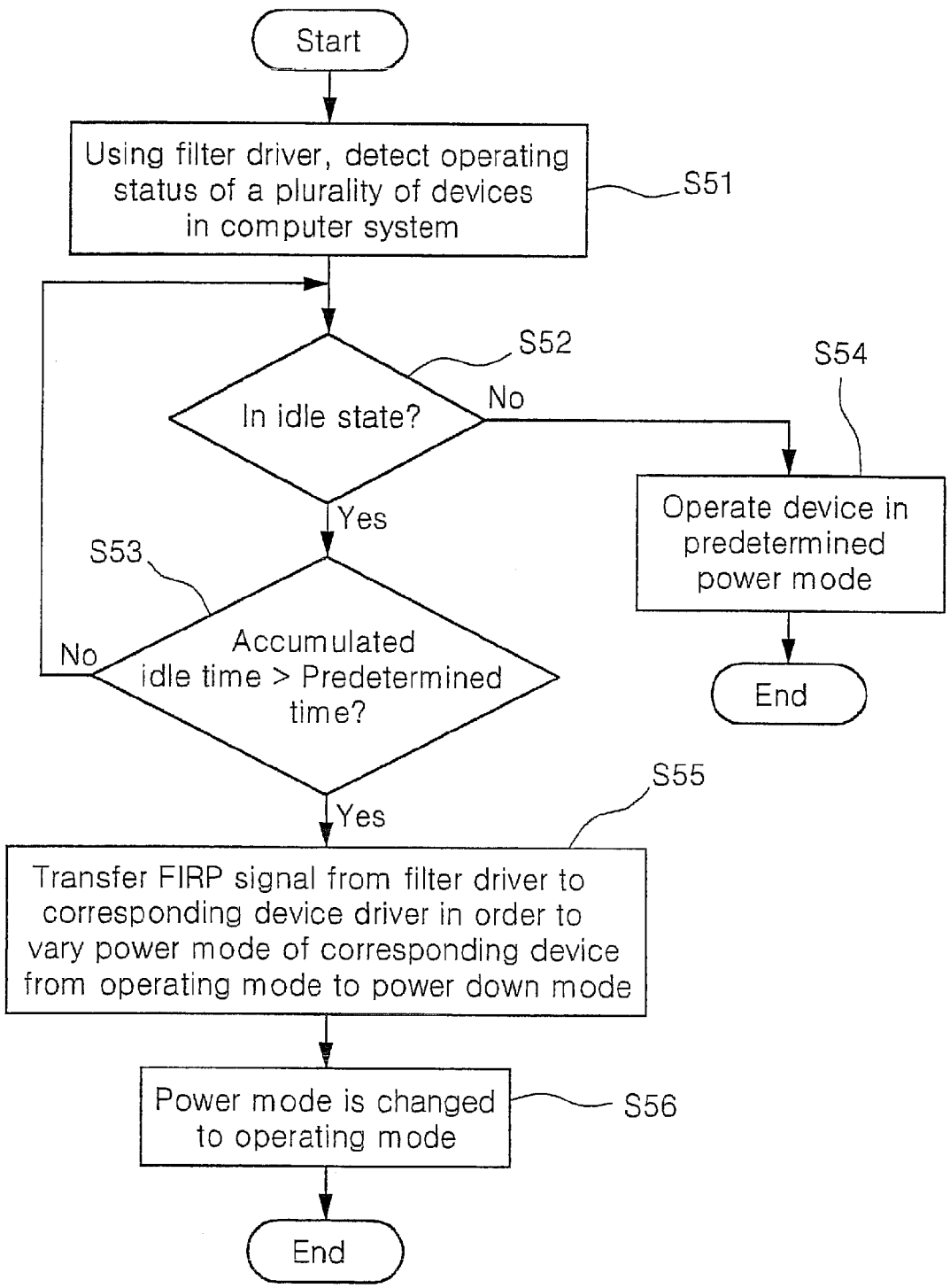

FIG. 6

```
NTSTATUS
  PoRequestPowerIrp(
    IN PDEVICE_OBJECT  DeviceObject,
    IN UCHAR  MinorFunction,
    IN POWER_STATE  PowerState,
    IN PREQUEST_POWER_COMPLETE  CompletionFunction,
    IN PVOID  Context,
    OUT PIRP  *Irp OPTIONAL
    );
```

FIG. 7

```
PULONG
  PoRegisterDeviceForIdleDetection(
    IN PDEVICE_OBJECT DeviceObject,
    IN ULONG ConservationIdleTime,
    IN ULONG PerformanceIdleTime,
    IN DEVICE_POWER_STATE  State);
```

APPARATUS AND METHOD FOR MANAGING POWER IN COMPUTER SYSTEM

CROSS-REFERENCE TO RELATED APPLICATIONS

This application is a continuation of U.S. patent application Ser. No. 10/630,771, filed on Jul. 31, 2003 now U.S. Pat. No. 7,376,851, the contents of which are incorporated herein by reference.

BACKGROUND OF THE INVENTION

1. Field of the Invention

The present invention relates to a computer system mounted with a plurality of devices, and more particularly, to an apparatus and a method for managing power in a computer system.

2. Background of the Related Art

FIG. 1 illustrates a configuration of an apparatus for managing power in computer system. In the following description, the 'power down mode' refers to all kinds of power modes (i.e. standby, suspend, or power off etc.) except for the power on mode (e.g., normal operation mode). The computer system includes an operation system 10, a device driver 20, a bus driver 30, and devices 40. A power mode for respective devices 40, including a network adaptor, a display adaptor, a mouse, a monitor, a disk drive, a digital camera, a scanner, and a sound card, is collectively determined in accordance with a system power mode that is set up by the operation system 10.

For instance, suppose that the operation system 10 sets up the system power mode to the power down mode. Then, the device driver 20 sets up a power mode for a device it has been operating and controlling to the power down mode. On the other hand, if the operation system 10 sets up the system power mode to an operating mode, the device driver 20 sets up the power mode for the device it has been operating and controlling to the operating mode and supplies power in a normal manner. Thus, the device driver 20 varies the power mode of the device corresponding to the system power mode set up by the operation system 10 to either the operating mode (e.g., D0) or the power down mode (e.g., D1, D2, D3).

For example, the operation system 10 can generate an I/O Request Packet (IRP) that corresponds to the system power mode it has set up, and output the IRP to the device driver 20. Then, the device driver 20 identifies the IRP and generates a Device Power Mode Packet (DPMP) for enabling the power mode of an object (e.g., corresponding) device 40 to the operating mode or the power down mode and outputs the DPMP to the very top end of a driver stack to notify every driver that the device power mode has been changed.

In response to the DPMP, the device 40 operates its hardware and varies the power mode to the power down mode or the operating mode, and transmits the power mode packet to a bus driver 30. The bus driver 30 changes a bus-power mode to the power down mode when every device under a corresponding bus (e.g. PCI, USB, IEEE1394 and the like) is in the power down mode. Hence, when the operation system 10 sets up the system power mode to the power down mode, the power mode of each device changes to the power down mode. In other words, the entire computer system now enters into the power down mode.

As described above, the related art has various disadvantages. In the related art, the power mode for each device is collectively set up in accordance with the system power mode. In other words, once a current system power mode is in the operating mode, every device is in the operating mode. Accordingly, although some of devices might be in an idle state for a prescribed period of time, the power mode for those devices is all in the operating mode. In so doing, a lot of power was consumed unnecessarily and system loading is done ineffectively.

SUMMARY OF THE INVENTION

An object of the invention is to solve at least the above problems and/or disadvantages and to provide at least the advantages described hereinafter.

Another object of the present invention is to provide an apparatus and method for a computer system that can vary a power mode of a plurality of devices or each device in a computer system to each of a first and second power condition.

Another object of the present invention is to provide an apparatus and a method for managing power in a computer system that can vary power mode of each device in a computer system to a power on mode (normal mode) or a power down mode independently from a system power mode set up by an operation system (OS) of the computer.

The foregoing and other objects and advantages can be realized in a whole or in part by providing an apparatus for managing power in a computer system that includes an operation system configured to set up a power mode of the computer system, wherein the power mode includes at least one of an operating mode and a power down mode, at least one device configured to perform specific functions and operations, at least one device driver configured to control operations on a corresponding device, wherein the device driver is configured to change the power mode of the corresponding device among the at least one of the operating mode and the power down mode, and a filter driver coupled to the operation system, wherein the filter driver is configured to individually control a selected device to operate in the power down mode when the computer system is in the operating mode.

The foregoing and other objects and advantages can be realized in a whole or in part by providing a method that includes operating a computer system in first and second power modes, operating devices in the computer system in the first and the second power modes, and controlling a selected device in the second power mode when the computer system is in the first power mode.

The foregoing and other objects and advantages can be realized in a whole or in part by providing a method for managing power in a computer system includes detecting at least one device that is in the idle state when a power mode of the computer system is in an operating mode, determining idle time of detected devices in the idle state, and changing a power mode of a corresponding device from the operating mode to a power down mode when the idle state is not reset for a predetermined time.

The foregoing and other objects and advantages can be realized in a whole or in part by providing a method for managing power in a computer system that includes setting up a power state of a corresponding device to a power down state, transferring a power control message for changing the corresponding device to an operating state to a device driver before transferring a message received for the corresponding device to the device driver, transferring the received message to the device driver after the corresponding device is changed to the operating state, and setting the corresponding device to the power down state after the device driver completes handling the message.

The foregoing and other objects and advantages can be realized in a whole or in part by providing a method for managing power in a computer system that includes detecting whether a device is in the idle state when a power mode of the computer system is in operating mode, counting idle time for the detected device in the idle state, and changing the power mode of the device from the operating mode to the power down mode when the idle time that has been counted is greater than a predetermined time.

The foregoing and other objects and advantages can be realized in a whole or in part by providing the filter driver equipped with a packet monitoring function detects whether the devices mounted in the computer system are in the idle state. If a device is in the idle state, the power mode of the corresponding device is varied to the power down mode, independent of the system power mode state that has been set up by the operation system in the computer system. In this manner, no more unnecessary power needs to be supplied to devices in the idle state, and it becomes possible to have a more efficient control over the load of the computer system. Overall, the present invention can be very advantageously used for developing and expanding the computer system more simply by adding the filter driver into the system, without changing a device driver in the computer system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a flow chart illustrating a filter driver method for managing an operating mode and power down mode of a device according to a preferred embodiment of the present invention;

FIG. 6 is a diagram illustrating a procedure for generating a FIRP;

FIG. 7 is a diagram that illustrates a procedure for setting up a timer for idle detection and for managing power mode thereof according to another embodiment of the present invention;

DETAILED DESCRIPTION OF PREFERRED EMBODIMENTS

Figure 1:
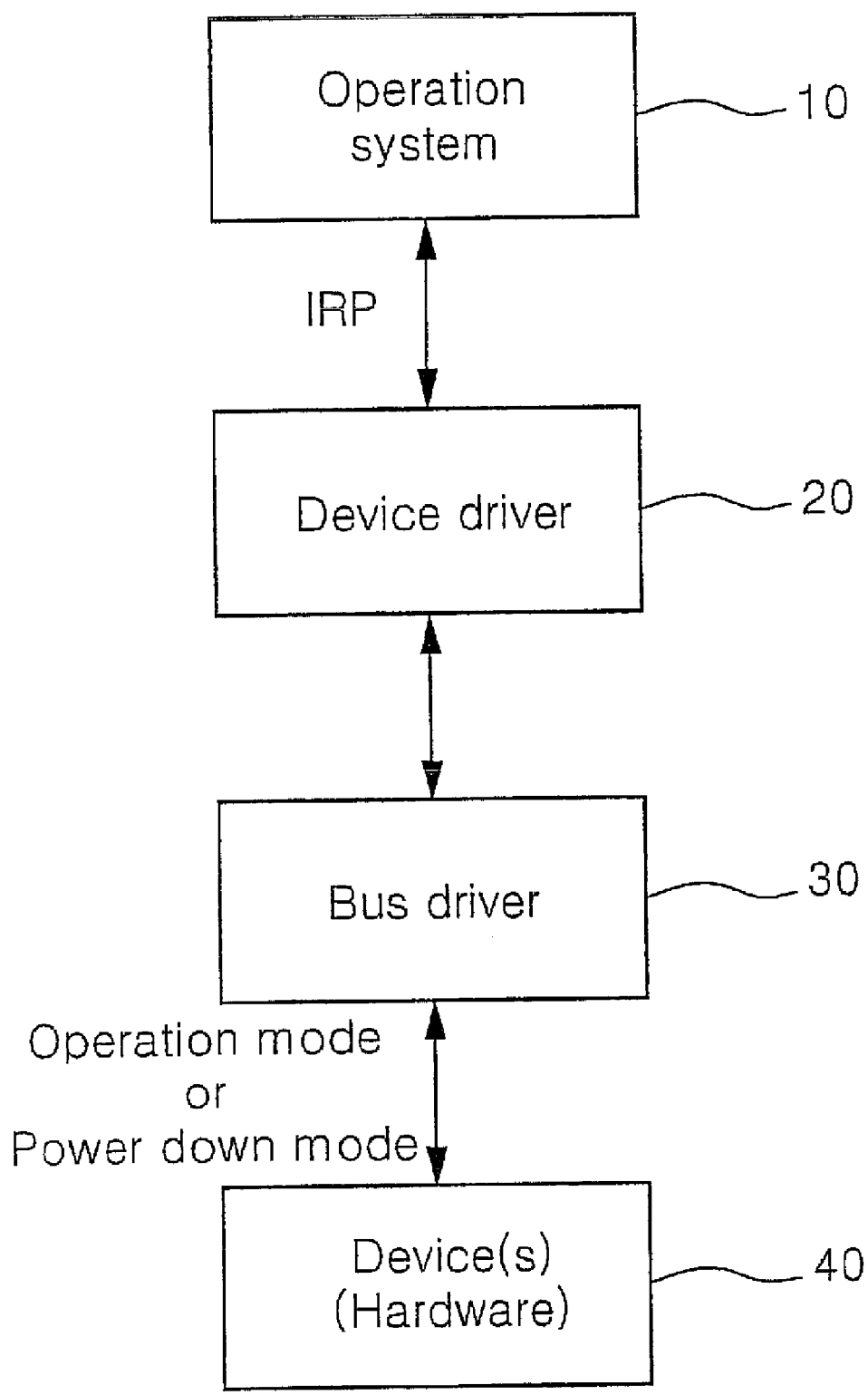
FIG. 1 is a block diagram illustrating a related art apparatus for managing power in a computer system.
Figure 2:
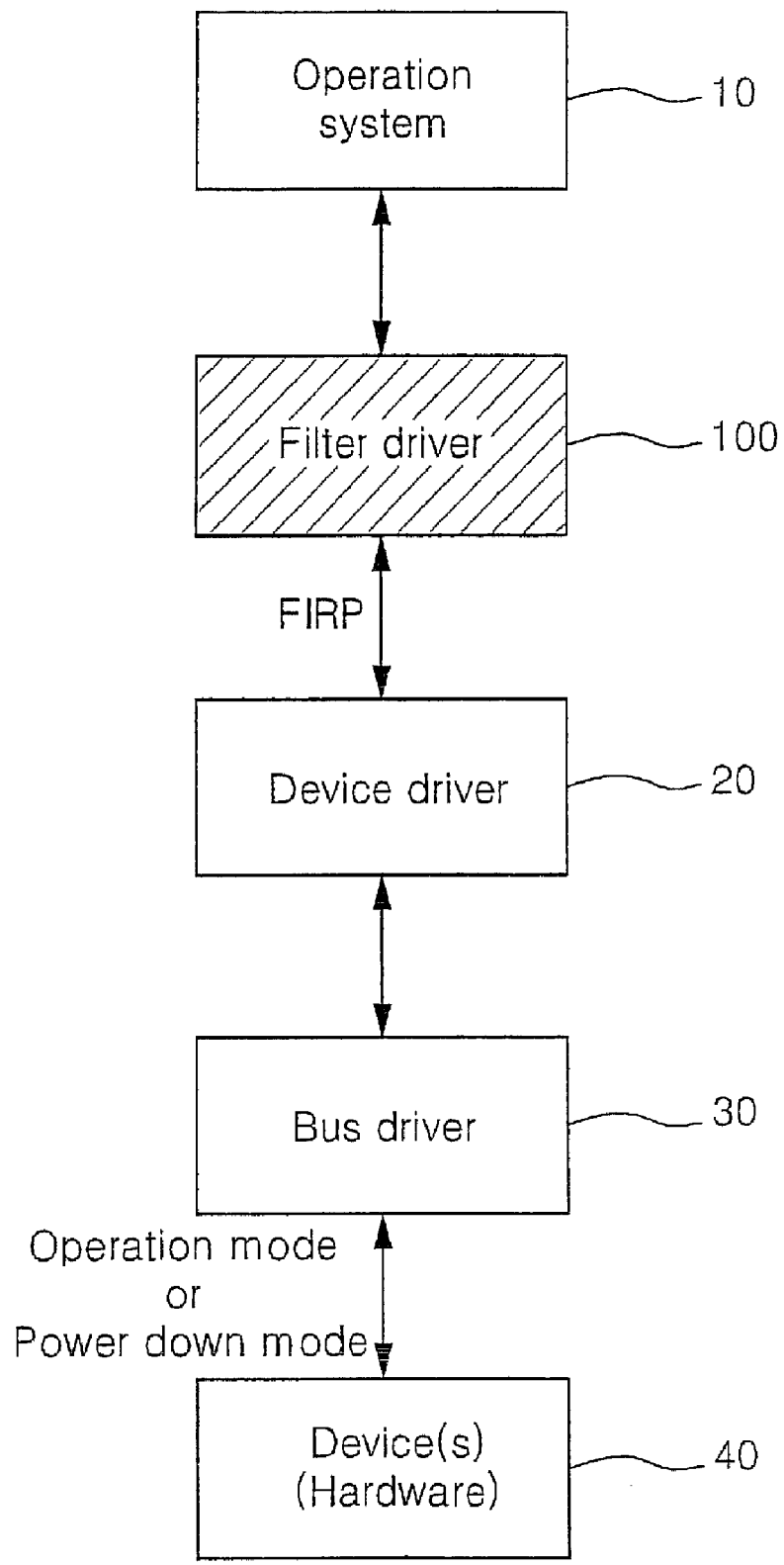
FIG. 2 is a block diagram illustrating a preferred embodiment of an apparatus for managing power in a computer system according to the present invention.

FIG. 2 is a block diagram illustrating an apparatus for managing power in a computer system according to a preferred embodiment of the present invention. As depicted in FIG. 2, the computer system can include an operation system (OS) 10, a device driver 20, a bus driver 30, devices 40, and a filter driver 100. The filter driver 100 can serve to expand e.g., adding or modifying, the functions of the device driver 20.

At least one filter driver 100 is preferably included in a driver stack to expand the functions of the device driver 20. For example, when the filter driver 100 added to a top level of the device driver 20 and the system power mode set up by the operation system 10 is in the operating mode, the filter driver 100 can inform this to the device driver 20. However, the present invention is not intended to be so limited to the location of the filter driver or corresponding functions. The filter driver 100 can further transmit or relay data that has been generated in the devices 40 to the operation system 10 via the device driver 20.

Figure 3:
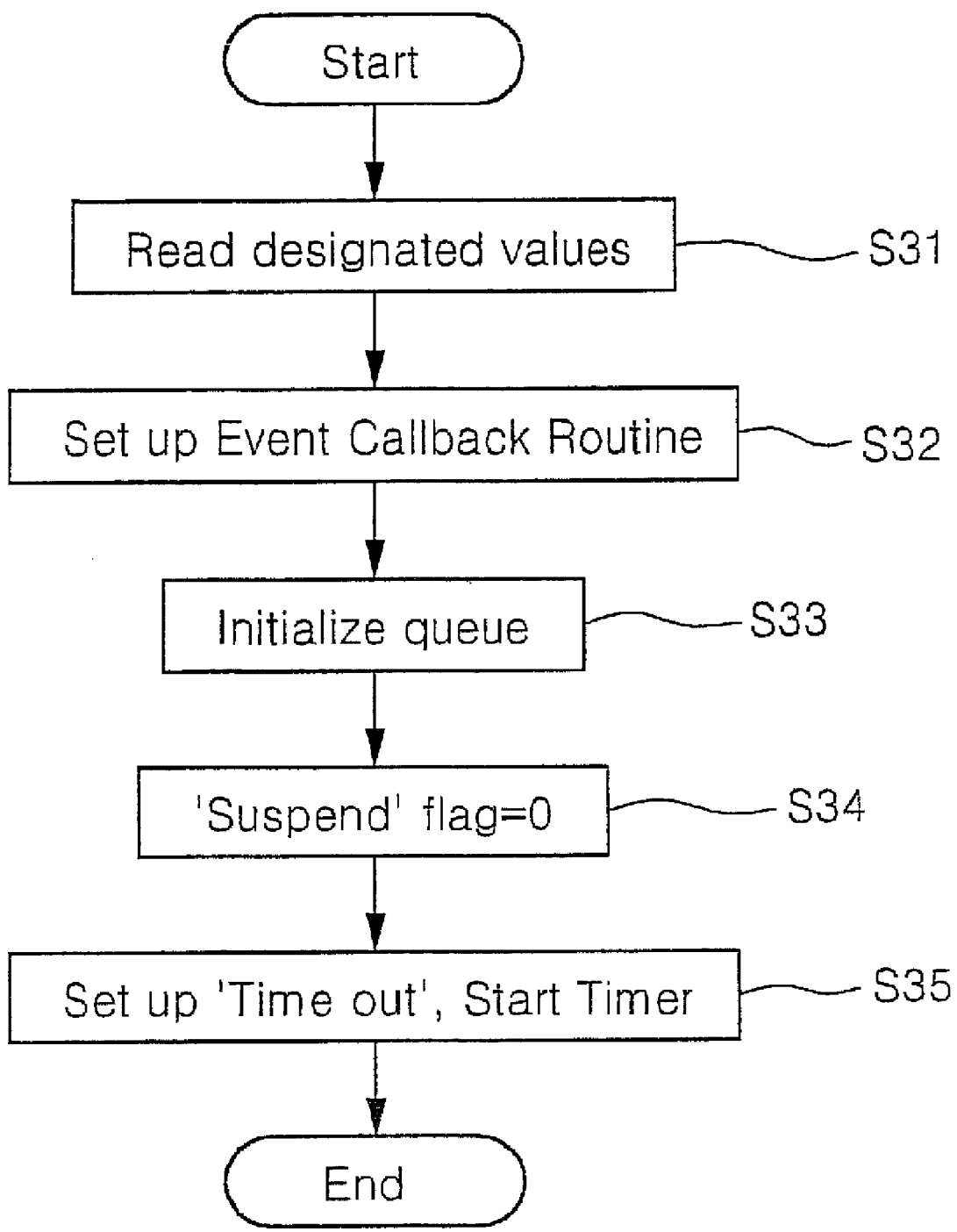
FIG. 3 is a flow chart shown an exemplary loading process for a filter driver and starting a timer when a computer system is booted up.
Figure 4:
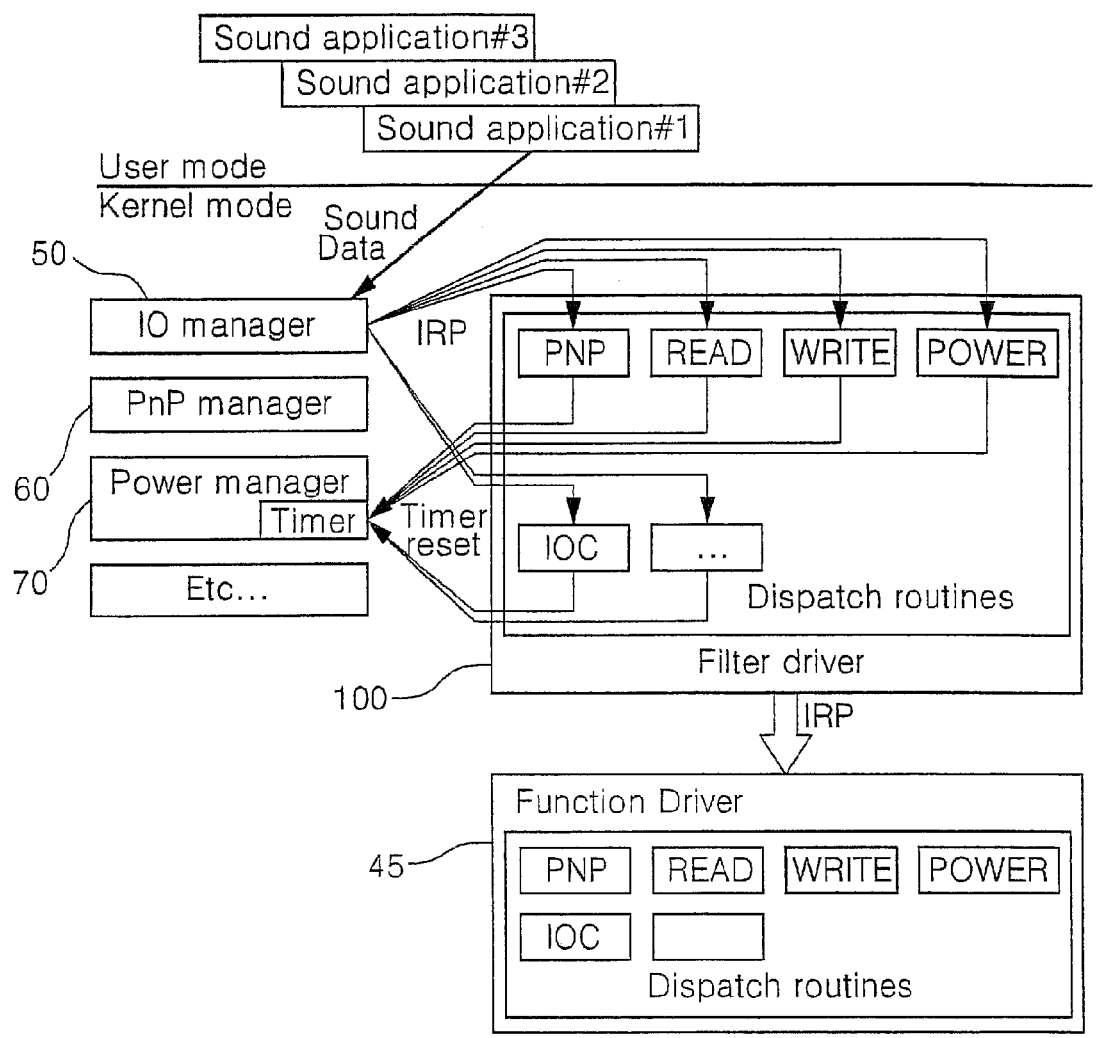
FIG. 4 is a schematic diagram illustrating exemplary interactions among a user mode, a Kernel mode, a filter driver and a function driver.

FIG. 3 illustrates a flow chart that shows an exemplary loading process onto a filter driver and starting a timer preferably when a computer system is initialized or booted up. FIG. 4 is a schematic diagram illustrating exemplary interactions among a user mode, a Kernel mode (e.g., handled in the operation system), the filter driver 100 and a function driver 45 according to preferred embodiments.

When the system is booted up, a device driver (e.g., device driver 20) is first loaded onto a memory and then a filter driver (e.g., filter driver 100), and an initializing procedure as shown in FIG. 3 can follow. After a process starts in FIG. 3, control passes to step S31. Timeout values that are preferably set up by a user are read out first (step S31).

Then, other basic works or functions for operating the filter driver preferably come next. That is, a space for temporarily storing an I/O Request Packet (IRP) can be assigned, an event call back routine can be set up, a queue can be initialized and then an interval variable suspend (e.g., 'Suspend' flag) to be used can be initialized (steps S32, S33, and S34).

Further, a timer can be set up. Then, the timer (e.g., time out timer) can be started (step S35). After step S35, the process is complete.

As shown in FIG. 4, exemplary application programs executed or dispatched in the user mode can generate various sound streams, and sound data of FIG. 4 can be converted to an IP request packet (IRP) through an IO manager and eventually transferred to a sound device driver. A sound device driver (e.g., function driver 45) can be composed of a plurality of dispatch routines, including a CREAT Dispatch (IOC) for handling an IRP that is generated when the sound device driver is used, a power dispatch for handling a power IRP for modifying or inquiring power of the device, or a PnP dispatch for handling an IRP involved in the installation, removal and operation of the device.

Three exemplary methods for a filter driver (e.g., filter driver 100) to manage the operating mode and the power down mode of a corresponding device(s) will now be described. However, the present invention is not intended to be so limited.

FIG. 5 shows a first preferred embodiment of a method for operating a filter driver. The filter driver 100 preferably continuously monitors an operating mode of the devices 40 (step S51). If an object device 40 of the devices 40 does not operate longer than a predetermined time and enters into an idle state, accumulates the object devices 40 idle time (steps S52, S53).

If the accumulated idle time is greater than the predetermined (e.g., base) time (step S53), the filter driver 100 generates a control signal, e.g. a FIRP (False IRP), which can be similar to the IRP generated and output by the operation system 10, to preferably enable the power mode of the object device 40 from the operating mode to transition to a desired power mode (e.g., power down mode) even when the system power mode set up by the operation system 10 is the operating mode. The filter driver 100 can transfer the FIRP to the corresponding device driver 20 (step S55).

Receiving the FIRP, the device driver 20 concludes that the power mode of the object device has been varied (e.g., preferably responds similarly to the IRP that is generated in and outputted from the operation system 10). Thus, the device driver 20 can set the power mode for the object device in the idle state to the power down mode, which can reduce or prevent unnecessary power supply to the device in the idle state (step S56).

If the accumulated value of the idle time is not larger than the predetermined value (step S53) the accumulating of the idle time preferably continues. Thus, control preferably jumps back to step S52. If it is determined that the object device is not in the idle state (step S53), preferably the device is operated in a predetermined power mode (step S54).

FIG. 6 is a diagram illustrating an exemplary procedure for generating a control message being a FIRP. As shown in FIG. 6, the operation system generates an IRP corresponding to the system power mode it has set up, and outputs the IRP to an object device (PoRequestPowerIrp, PDEVICE_OBJECT).

Depending on kinds of the Power IRP, the power state of the device is either changed or inquired to set up a desired power state (e.g., D0, D1, D2, and D3) (MinorFunction, Powerstate). Each numeral indicates different power states. For example, D0 indicates 'Power ON'; D1 indicates 'standby'; D2 indicates 'Suspend'; and D3 indicates 'Power off'.

After setting up the power state, the system can be executed in accordance with the new state (CompletionFunction). A FIRP is output in case the system is on for a predetermined period of time.

In FIG. 6, the term 'DeviceObject' denotes a physical driver of an object device, and the 'MinorFunction' is an example of Power IRPs, changing or inquiring the power of the device. In addition, the 'PowerState' refers to a power state, such as, D0, D1, D3, and D4. The 'CompletionFunction' is a callback routine that dispatches after the power state is changed. Lastly, the 'Context' is a factor to be transmitted to the callback routine.

A second method for the filter driver (e.g., filter driver 100) to manage the operating mode and the power down mode of the device will now be described. The filter driver (e.g., the filter driver 100 of FIG. 2, similar to FIG. 4) can operate an idle detection function of a power manager 70 in the operation system, and if the timer is not reset until the predetermined time lapses, changes the power state of an object device or devices. Further description will be provided below with reference to FIGS. 7 through 9.

FIG. 7 is a second preferred embodiment of a method for a filter driver to manage a power mode of a plurality of devices. As shown in FIG. 7, the method can reset the timer for idle detection and for managing the power mode thereof The power manager (e.g., filter driver) provides a function for resetting the timer and changing a state of a device after the predetermined (or pre-registered) time so as to perform idle detection on each device and manage power for respective devices (e.g., PoRegisterDeviceForIdleDetection). In the function, there is preferably a timeout value in battery mode, a timeout value in performance mode, and a device power state when the time is out. That is, when the object device is designated, the power manager, after the pre-registered time goes by, generates a power IRP for changing the power state to a registered power state on the object device.

Here, the 'DeviceObject' indicates an object device; the 'ConversationIdleTime' indicates a timeout in battery mode; the 'PerformanceIdleTime' indicates a timeout in AC mode; and the 'State' indicates a device power state after the time is out. On the other hand, when the device is in operation, an internal time should be reset and reinitialized using the function provided by the power manager (e.g., PoSetDeviceBusy).

Figure 8:
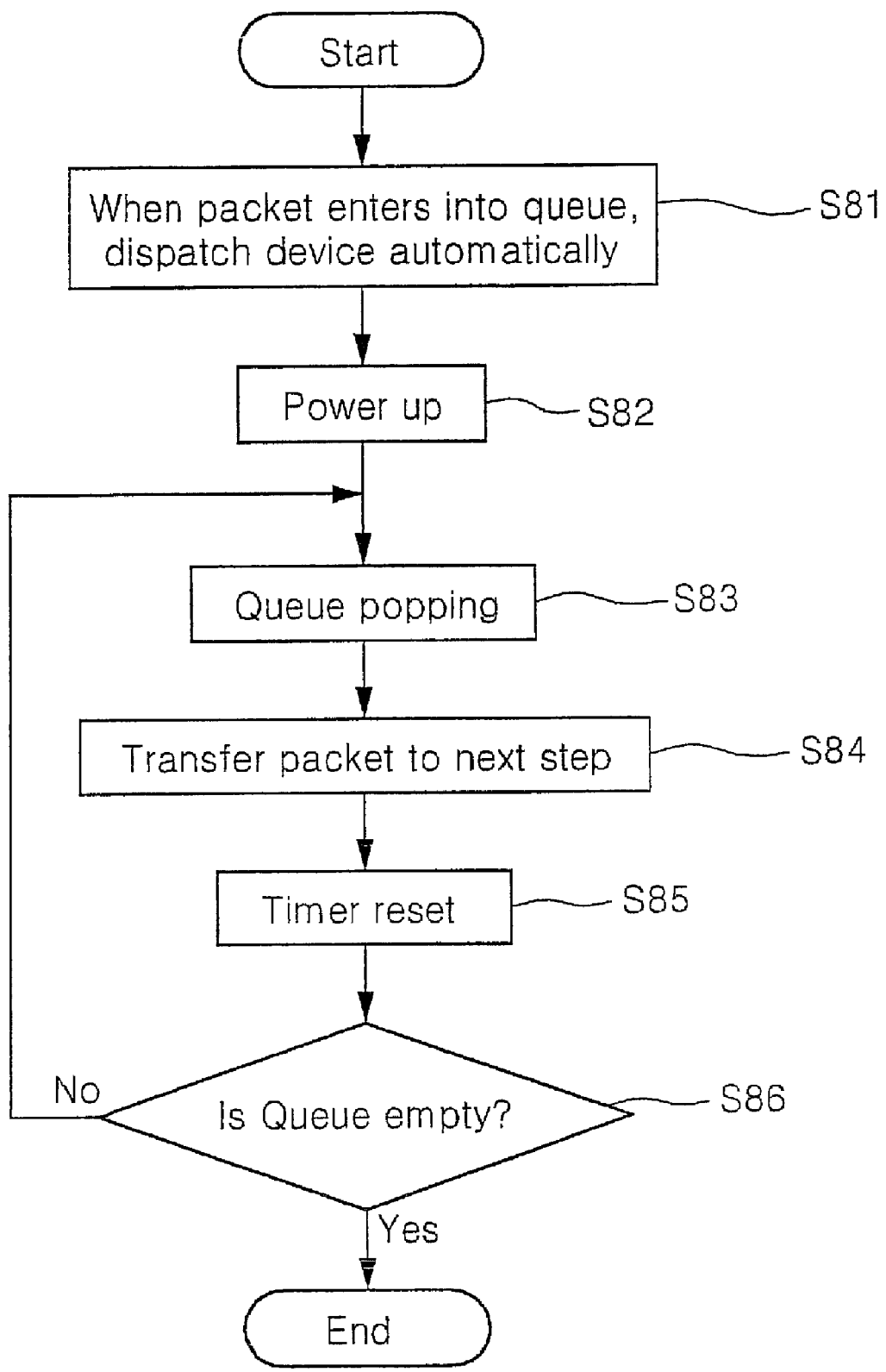
FIG. 8 is a flow chart illustrating another preferred embodiment of a method for changing a power mode of an object device in a case that a packet data is received from the user mode (application program) to an operating system and an IRP is transmitted from an IO manager.

FIG. 8 is a flow chart illustrating a method for changing the power mode of the object device according to the second preferred embodiment. In FIG. 8, the procedure changes the power mode of the object device in a case that a packet data is received from the user mode to the Kernel mode in FIG. 4 and an IRP is transmitted from an IO manager.

After a process starts in FIG. 8, when the packet is entered into a queue, it is automatically dispatched (step S81). The above routine has a low priority in the operation system so it is dispatched after the operation system completes other work with higher priorities. Thus, there could be a number of IRPs in the queue. If the system is in a state just prior to the suspend mode (i.e. Suspend flag=1), the routine is not dispatched because there is no IRP in the queue.

If the device is in the power down mode according to the step S81, the power of the device goes up preferably to the operating mode (e.g., using a filter driver) (step S82), and then a packet is brought from the queue (step S83), which packet is then passed over the device driver of the next step (step S84). Now that the device is being used, the corresponding timer is reset and the device does not go back to the power down mode (step S85).

If there is any packet left over in the queue, the procedure starting from the step S83 is repeated. However, if there is no further packet, the routine is completed. When the routine is not dispatched again until the timer is out, the power manager (e.g., using the filter driver) sends the power down IRP, setting up the device in the power down mode (step S86).

Figure 9:
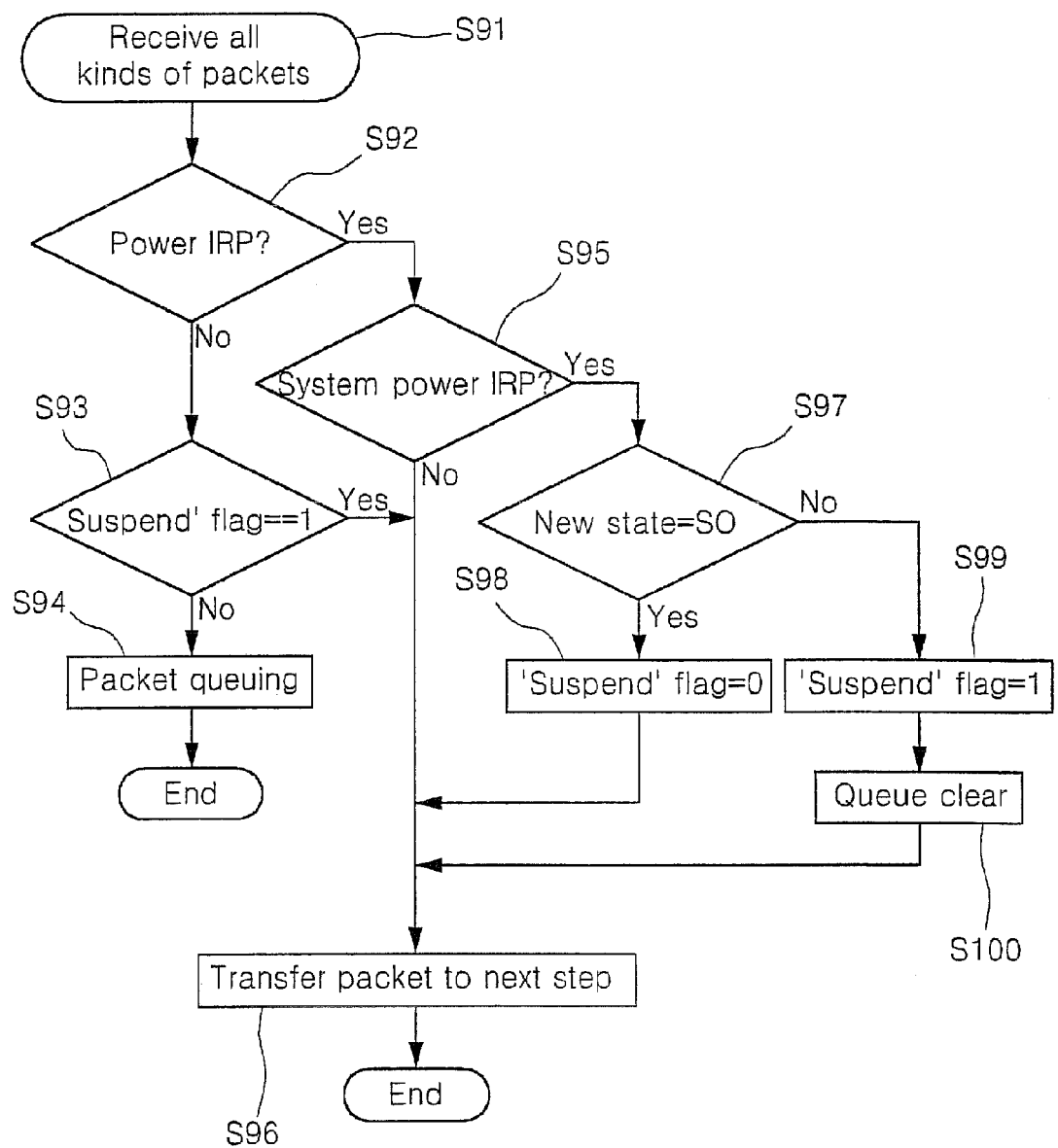
FIG. 9 is a flow chart illustrating a procedure for handling transmitted IP request packets at a filter driver.

Generally, as shown in FIG. 9, when an IRP is received from an IO manager (e.g., IO manger 50) in the Kernel mode, a routine begins with dispatch routines receiving all kinds of packets (step S91). The process in FIG. 9 can be applicable to each preferred embodiment of systems, methods and filter drivers according to the present invention. First, it is determined if the received IRP is a power IRP (step S92), if not, the internal variable, i.e. Suspend flag=1, is compared. In other words, it is compared whether the system is in the state just prior to the suspend mode (step S93).

At the result of the comparison (steps S92 and S93), if it is determined that the received IRP is not the power IRP and the internal variable is Suspend flag=0, packets are put in the queue to promote the filter driver to do the normal operation (step S94). Once the packets are put in the queue, a queue handling routine is executed under the operation system (OS).

If it is determined in the step S92 that the received power IRP is the power IRP, another comparison is made whether the packet is a system power IRP for changing the power state (step S95). If it is determined that the received packet has nothing to do with the system power IRP, the next step (e.g., device driver) proceeds (step S96).

However, if the received power IRP is the system power IRP in the step S95, it is compared whether the IRP is in a new state, or S0 (step S97).

If it is in the new state S0, this means that the system is waking up so the internal variable should be cleared, i.e. Suspend flag=0. This indicates that the filter driver turned back to the normal operating mode (step S98).

If the IRP is not in a state of S0 (step S97), this means that the system is entering into the power down mode. In such case, the internal variable is set to be Suspend flag=1, and no further IRP is allowed to the queue (step S99). Any remaining IRPs in the queue are all removed or compressed, and the routine is finished (step S100).

From steps S98 and S100, the process continues to step S96. From steps S94 and S96, the process ends.

A third preferred embodiment of a filter driver can manage the operating mode and the power down mode of the device without the timer. In a filter driver (e.g., filter driver 100) an initial power state of the device 40 or each device is in the power down mode. Then, in the dispatch routine according to the filter driver, the IRP handling routine as the device is used, the power IRP is generated for transitioning the object device in the operation state before the IRP is transferred to the device driver 20. Once the object device is in the operation state, the received IRP is then forwarded to the device driver 20.

The object device preferably does not go back to the power down mode until the device driver completes the IRP handling. Accordingly, when IRPs are received continuously, the device is powered up when the first IRP is received and powered down at the last IRP. In other words, corresponding to the first associated IRP taken from the queue, the device is powered up and when the queue is empty or clear, it is powered down.

Further, each method described above may or may not use the queue. If the queue is not used, and especially when the device to be used in the application in the user mode wakes up to the operating mode from the power down mode, the device may stop its operation temporarily and restart when the power IRP is being handled.

Figure 10:
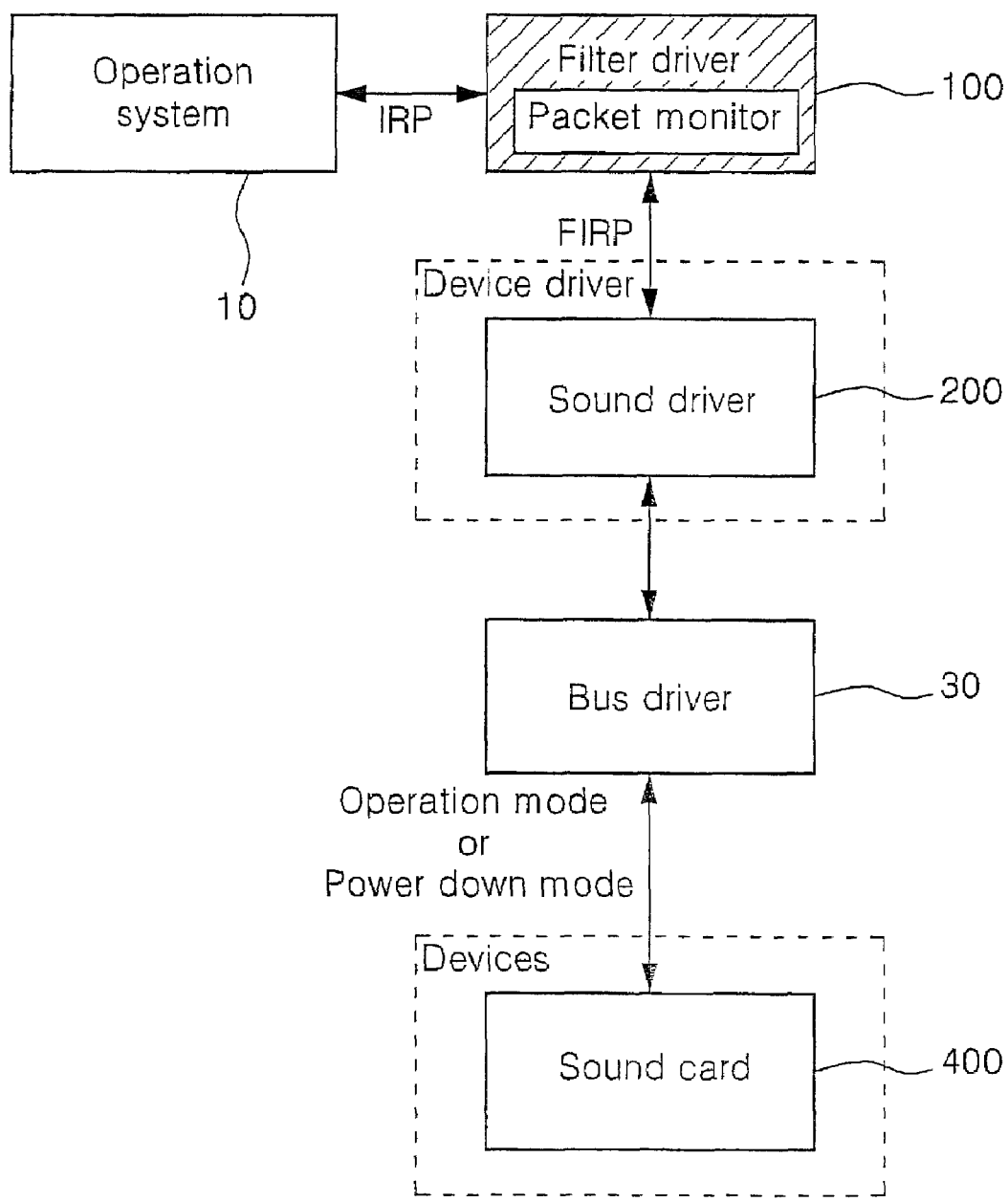
FIG. 10 is a block diagram that shows a preferred embodiment of the apparatus for managing power in a computer system according to the present invention.

FIG. 10 illustrates a preferred embodiment of an apparatus for managing power in a computer system according to the present invention. For example in FIG. 10, the device driver 20 is a sound driver 200 and the device 40 is a sound card 400 as described before with reference to FIG. 2. However, the present invention is not intended to be so limited. In case that a random data is received for the sound card 400 from the operation system 10, the apparatus for managing power (e.g., filter driver 100) checks the power mode of the sound card 400.

If the power mode of the sound card 400 is the operating mode, the received data from the operation system 100, while maintaining the operating mode, passes through the sound driver 200 and is transferred to the sound card 400 according to the filter driver where a series of functions and operations corresponding to it are performed.

However, if the power mode of the sound card 400 is the power down mode, the data from the operation system is temporarily stored, and a control signal, such as the FIRP for enabling the power mode of the sound card from the power down mode to the operating mode, is generated, and the FIRP is later transferred to the sound driver 200. In this manner, the power mode of the sound card is varied from the power down mode to the operating mode before transfer of the received data.

After the power mode of the sound card is changed to the operating mode following the above procedure, the temporarily stored data is sent to the sound card 400 via the sound driver 200, and a series of functions and operations corresponding to it are performed in the sound card.

Meanwhile, the filter driver 100 continuously monitors the operation state of the sound card and if it is in the idle state for more than a designated time, accumulates the idle time. In case the accumulated idle time exceeds the predetermined base time, independent of the system power mode set up by the operation system 10, the FIRP is generated and transferred to the sound driver 200 in order to enable the power mode of the sound card 400 to the power down mode. Based on the FIRP, the sound driver 200 changes the power mode of the sound card 400 in the idle state to the power down mode, which can reduce or prevent any unnecessary power from being supplied to the sound card in the idle state.

Shortly speaking, without changing the sound driver 200 mounted in the computer system, the power mode of each sound card in the idle state can be varied, independently from the system power mode (e.g., from the operating mode to the power down mode) by adding the above-described filter driver 100. On the other hand, if a data is sent from the operation system 10 to the sound card 400 when the sound card 400 being in the power down mode, the filter driver 100 stores the data temporarily and generates the FIRP, requesting to enable the power mode of the sound card from the power down mode to the operating mode and transfers the FIRP to the sound driver 200. When the power mode of the sound card 400 is changed from the power down mode to the operating mode, the filter driver 100 sends the temporarily stored data to the sound card 400 via the sound driver 200, and a series of functions and operations corresponding to it are performed in the sound card 400.

In summary, without modifying the conventional device driver 20 in the computer system, it is possible to enable the power mode of devices in idle state to the power down mode, independent of the system power mode, by adding preferred methods and preferred embodiments of filter driver 100 to the system. For example, the filter driver 100, using the packet monitoring function, continuously monitors transceived data packets to diverse devices including a network adaptor, a display adaptor, a mouse, a monitor, a disk drive, a digital camera, a scanner or a sound card, and detects whether a corresponding device is in the idle state, and if so, counts the idle time.

The foregoing embodiments and advantages ate merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses ate intended to cover the structures described herein as performing the recited function and not only structural equivalents but also equivalent structures.

What is claimed is:

1. An apparatus for managing power in a computer system, the apparatus comprising:
an operation system configured to set up a power mode of the computer system;
at least one device configured to perform specific functions and operations;
at least one device driver configured to control one or more operations of the device; and
a control driver coupled to the operation system, wherein the control driver is configured to individually control a power mode of the device independent from a power mode of one or more other devices in communication with the computer system, and wherein the control driver:
generates a signal to cause the device driver to individually change the power mode of the device to operate in a power down mode when the computer system is in an operating mode based on a status of a suspend flag value indicative of whether a received input/output request packet (IRP) is a power IRP, and
controls the device to operate in the power down mode independently from the computer system which continues in the operating mode.

2. The apparatus according to claim 1, wherein the control driver is a filter driver coupled to the operation system.

3. The apparatus according to claim 2, wherein the filter driver individually controls the power mode of the device irrespective of the power mode of the computer system.

4. The apparatus according to claim 2, the filter driver detects an idle state of the device through monitoring transceived packets between the operation system in the computer system and the device driver.

5. A method, comprising:
operating a computer system in first and second power modes;
operating one or more devices in the computer system in the first and the second power modes;
controlling a selected device to operate in the second power mode when the computer system is in the first power mode, wherein the first power mode is an operating mode and the second power mode is a power down mode and wherein controlling the selected device comprises:
detecting that the selected device is in the idle state;
counting an idle time for the selected device while in the idle state; and
changing the power mode of the selected device from the operating mode to the power down mode when the counted idle time is greater than a prescribed amount; said method further comprising:
generating a False I/O request packet (FIRP) similar to an I/O request packet of the computer system at a filter driver when the counted idle time is greater than the prescribed amount; and
transferring the FIRP to the selected device, wherein the FIRP is generated by:
generating, at an operation system, an IRP corresponding to the system power mode set up by the operation system, and outputting the IRP to the selected device;
changing a power state of the selected device according to a kind of the power IRP, and setting up one or more desired power states;
dispatching at least one of the computer system or the operation system based on a new status corresponding to the changed power state of the selected device; and
outputting the FIRP if the power state continues longer than a predetermined time.

6. An apparatus for managing power in a computer system, the apparatus comprising:
an operation system configured to set up a power mode of the computer system;
at least one device configured to perform specific functions and operations; and
at least one driver configured to control one or more operations of the device and to individually control a power mode of the device independent from a power mode of one or more other devices in communication with the computer system, and wherein the driver:
generates a signal to change the power mode of the device to operate in a power down mode when the computer system is in an operating mode based on a status of a suspend flag value indicative of whether a received input/output request packet (IRP) is a power IRP, and
controls the device to operate in the power down mode independently from the computer system which continues in the operating mode.

7. The apparatus according to claim 6, wherein the driver monitors transceived packets between the operation system and the driver, and detects the device in the idle state.

8. The apparatus according to claim 6, wherein the driver individually controls the power mode of the device based on a result of a predetermined time of the detected idle state.

9. The apparatus according to claim 6, wherein the driver outputs signal data which differs from a signal being outputted in the operation system.

10. The method of claim 5, wherein the power mode of the selected device is controlled independently from a power mode of one or more other devices in communication with the operation system, and wherein the power mode of the selected device is individually changed to operate in the power down mode when the computer system is in an operating mode based on a status of a suspend flag value indicative of whether a received input/output request packet (IRP) is a power IRP, and wherein the selected device is controlled to operate in the power down mode independently from the computer system which continues in the operating mode.

11. A method for managing power in a computer system, comprising:
if a power mode of the computer system is in an operating mode, detecting at least one device coupled to the computer system that is in an idle state;
accumulating an idle time of the detected device the idle state; and
if the idle state is not reset for a predetermined base time, changing a power mode of the device from an operating mode to a power down mode, wherein:
a power manager provides a timer for checking respective devices in the idle state and managing power, and performing a function (PoRegisterDeviceForIdleDection) for changing a state of the device after a predetermined time lapses, wherein:
the power mode of the device is changed independently from a power mode of one or more other devices in communication with the computer system,
a signal is generated to individually change the power mode of the device to operate in the power down mode when the computer system is in an operating mode based on a status of a suspend flag value indicative of whether a received input/output request packet (IRP) is a power IRP, and
the device is controlled to operate in the power down mode independently from the computer system which continues in the operating mode.

12. The method according to claim 11, wherein, if the device needs to be used, an internal timer is reinitialized by resetting the internal timer by using a function (PoSetDeviceBusy) provided by the power manager.

13. A method, comprising:
operating a computer system in a plurality of power modes;
operating devices in one or more power modes set in the computer system;
controlling a power mode of a selected device among the devices; and
operating the selected device irrespective of a power mode set in the computer system, wherein the power mode of the selected device is controlled independently from a power mode of one or more other devices in communication with the computer system, wherein a signal is generated to individually change the power mode of the selected device to operate in a power down mode when the computer system is in an operating mode based on a status of a suspend flag value indicative of whether a received input/output request packet (IRP) is a power IRP, and wherein the selected device is controlled to operate in the power down mode independently from the computer system which continues in the operating mode.

14. The method according to claim 13, wherein in a different mode of operation, the power mode of the selected device is controlled by:

detecting the selected device to be in an idle state;

counting idle time for the selected device in the idle state; and changing the power mode of the selected device from the power mode set in the computer system when the counted idle time for the selected device is greater than a prescribed amount.

* * * * *